Oct. 4, 1960     L. L. BARNES, JR     2,954,751
VISIBLE FILTER CLOGGING INDICATOR
Filed May 9, 1958
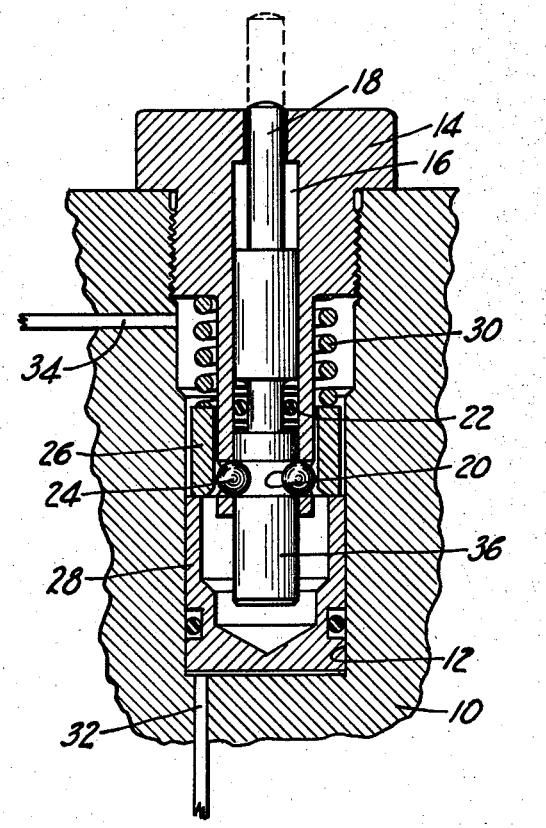
INVENTOR.
LLOYD L. BARNES, JR
BY
William N. Antonio
ATTORNEY

United States Patent Office 2,954,751
Patented Oct. 4, 1960

2,954,751

VISIBLE FILTER CLOGGING INDICATOR

Lloyd L. Barnes, Jr., Van Nuys, Calif., assignor to The Bendix Corporation, a corporation of Delaware Filed May 9, 1958, Ser. No. 734,191

2 Claims. (Cl. 116—70)

This invention relates to a visible filter clogging indicator and more particularly to a differential pressure indicator for use with a filter which will raise a warning signal when the differential pressure across the filter exceeds a predetermined value.

One of the objects of this invention is to provide a differential pressure indicator which will continue to indicate the clogged condition of the filter even after the apparatus with which the filter is associated has ceased to operate.

Another object of this invention is to provide a differential pressure indicator which is sensitive only to the differential between the filter inlet and outlet pressures and will not be affected by system pressures.

A further object of this invention is to provide a differential pressure indicator which will operate at extremely high pressures.

A still further object of this invention is to provide a readily observable differential pressure indicating device which may be easily and inexpensively fabricated.

The above and other objects and features of the invention will become apparent from the following description of the mechanism taken in connection with the accompanying drawing which forms a part of this specification.

Referring to the drawing it will be seen that the visible filter clogging indicator includes a housing 10 having a bore 12 therein, said housing being an integral part of a filtering device (not shown) or suitably attached thereto. A plug 14 is threaded into the open end of bore 12 and has a smaller bore 16 formed therein which contains indicator pin 18. The indicator pin, which has an annular groove 20 formed thereon, is slidable within bore 16 and is movable from a hidden first position to a visible second position, as shown in the drawing. A packing 22 is located between the indicator pin and bore 16 for frictionally engaging the wall of said bore. A plurality of locking balls 24 are located in groove 20 and are confined therein by lock ring 26 which is positioned between a piston member 28 and a preloaded spring 30, said spring urging the lock ring and piston towards the bottom of bore 12. Port 32 communicates one side of piston 28 with filter inlet pressure, while port 34 communicates the other side of piston 28 and the lower end 36 of indicator pin 18 with filter outlet pressure.

Operation of the indicator is as follows: When the filtering device starts to get clogged, the increased pressure drop across the filtering element will be such that the force created by the filter inlet and outlet pressures acting on piston 28 will exceed the force exerted by spring 30, thereby causing the piston to begin to move in an upward direction. As the differential pressure attains a predetermined maximum value, the piston 28 will have moved the lock ring 26 upwardly to a position which will permit the locking balls 24 to move radially out of the indicator pin groove 20. Since the filter outlet pressure is also acting on the lower end 36 of the indicator pin 18, the pin will be forced upwardly to a visible position when the balls have moved out of the groove. The friction of the indicator pin packing 22 will hold the indicator pin in its visible position until the pin is manually re-set.

Although this invention has been described in connection with a specific embodiment, it will be obvious to those skilled in the art that various changes may be made in the form, structure and arrangement of parts without departing from the spirit of the invention. Accordingly, applicant does not desire to be limited to the specific embodiment disclosed herein primarily for purposes of illustration, but instead desires protection falling within the scope of the appended claims.

Having thus described the various features of the invention, what I claim as new and desire to secure by Letters Patent is:

1. A differential pressure indicator for use with a filter comprising a housing having a first bore therein, a plug for closing one end of said first bore, said plug having a second bore formed therein and a sleeve-like projection extending therefrom into said first bore, said sleeve-like projection being spaced from the walls of said first bore and surrounding said second bore, passage means located in said sleeve-like projection for communicating said first bore with said second bore, an indicator pin slidable within said second bore and movable from a hidden first position to a visible second position, said indicator pin having an annular groove formed thereon, a plurality of locking balls located partially in said groove and partially in said passage means for retaining said indicator pin in said hidden first position, a lock ring located in said first bore and surrounding said sleeve like projection for confining said locking balls in said annular groove, a piston member located in said first bore and movable therein for moving said lock ring to a position which will permit the balls to move radially out of said groove upon movement of said indicator pin toward said visible position, a spring for opposing movement of said lock ring and piston member, a first port for communicating one side of said piston member with a first variable pressure, a second port for communicating the other side of said piston member and the end of said indicator pin with a second variable pressure, said second variable pressure moving said indicator pin to the visible second position upon movement of said balls out of said groove, and friction means for retaining said indicator pin in the visible second position.

2. A device for signalling the clogged condition of a filter comprising a housing having a chamber formed therein, a tubular member closing one end of said chamber, said tubular member having a reduced portion extending into said chamber and being spaced from the walls thereof, a first port communicating with filter inlet pressure, a second port communicating with filter outlet pressure, an indicator having a recess formed thereon and being movable within said tubular member from a non-signalling to a signalling position, said indicator communicating with one of said ports and being urged towards said signalling position by the pressure exerted thereagainst, passage means located in the reduced portion of said tubular member, restraining means located partially in said recess and partially in said passage means for holding said indicator in said non-signalling position, a locking member located between the reduced portion of said tubular member and the walls of said chamber for preventing movement of said restraining means out of said recess, and pressure responsive means located in said chamber and movable therein for moving said locking member to a position permitting said restraining means to move out of said recess upon movement of said indicator toward the signalling position, said pressure responsive means being movably responsive to a predetermined differential in inlet and outlet pressures and causing movement of said locking member at said predetermined pressure differential.

References Cited in the file of this patent

UNITED STATES PATENTS

| | | |
|---|---|---|
| 2,167,456 | Hooper | July 25, 1939 |
| 2,669,707 | Ehrman | Feb. 16, 1954 |
| 2,843,077 | Leefer | July 15, 1958 |

FOREIGN PATENTS

| | | |
|---|---|---|
| 722,837 | Great Britain | Feb. 2, 1955 |
| 1,111,427 | France | Oct. 26, 1955 |